United States Patent [19]

Dahms

[11] 4,207,401

[45] Jun. 10, 1980

[54] FOAMABLE RESOLE RESIN COMPOSITION

[75] Inventor: Ronald H. Dahms, Springfield, Mass.

[73] Assignee: Monsanto Company, St. Louis, Mo.

[21] Appl. No.: 8,362

[22] Filed: Feb. 1, 1979

Related U.S. Application Data

[63] Continuation of Ser. No. 912,815, Jun. 5, 1978, abandoned.

[51] Int. Cl.² .............................. C08J 9/12; C08J 9/14
[52] U.S. Cl. .................................... 521/112; 521/114; 521/123; 521/125; 521/136; 521/154; 521/181
[58] Field of Search ....................... 521/181, 123, 125

[56] References Cited

U.S. PATENT DOCUMENTS

| | | | |
|---|---|---|---|
| 3,138,563 | 6/1964 | Morgan et al. | 521/181 |
| 3,522,196 | 7/1970 | Dorier et al. | 521/181 |
| 4,011,186 | 3/1977 | Higgenbottom | 260/29.3 |
| 4,067,829 | 1/1978 | Garrett | 521/181 |

*Primary Examiner*—Morton Foelak
*Attorney, Agent, or Firm*—David Bennett; William J. Farrington; Edward P. Grattan

[57] ABSTRACT

This invention relates to an improved foamable resole resin composition comprising a resole resin, a blowing agent and a surfactant wherein said improvement comprises incorporation dispersed calcium oxide particles in said composition providing a foamable resole composition curable to a non-corrosive foam. Methods for preparing, foaming and curing said noncorrosive foams are disclosed.

26 Claims, No Drawings

FOAMABLE RESOLE RESIN COMPOSITION

This is a continuation, of application Ser. No. 912,815, filed June 5, 1978, now abandoned.

BACKGROUND OF THE INVENTION

Foamable phenolic resole resin compositions are known comprising a resole resin, a blowing agent and a surfactant. U.S. Pat. No. 3,389,094 discloses such systems. Such compositions have been optimized by the selection of the blowing agents and surfactants to improve foamability and the structure of the foams.

Such compositions are based on incompletely condensed phenolic resole resins of phenol and formaldehyde. When such compositions are mixed with an acid catalyst and a blowing agent, an exothermic reaction with further condensation causes liberation of gas by the blowing agent. The curing resin has an increased viscosity which prevents the escape of said gases and the composition expands to a foam with a substantially closed cell structure. Finally, the resin cures completely to a rigid foam of great utility for insulation uses. The cured phenol/aldehyde resole resins have fire and smoke retardant properties which can be increased further with certain additives giving added utility.

Acids are used to foam and cure such foams, hence, leave the cured foam with a pH below about 3 which is corrosive to metal building materials when the foams are used as building insulation. It is the objective of the present invention to provide foamable resole resin compositions that are curable to noncorrosive foams.

SUMMARY OF THE INVENTION

The invention relates to an improved foamable resole resin composition curable to a non-corrosive foam, comprising a resole resin, a blowing agent and a surfactant, wherein the improvement comprises, having present in said composition dispersed calcium oxide particles larger than 60 mesh.

The invention also relates to an improved process for preparing a foamable resole resin composition, curable to a non-corrosive foam, comprising blending a resole resin, a blowing agent and a surfactant wherein the improvement comprises dispersing in said composition calcium oxide particles having a particle size larger than 60 mesh.

The invention also relates to an improved process for foaming foamable resole resin composition, the improvement comprising: adding an acid catalyst to the composition and allowing said composition to foam forming a cellular material.

EMBODIMENTS OF THE INVENTION

The Resole Resin Solution

Any conventional water soluble resole resin can be used. During the normal manufacture of single stage resole-type liquid phenolic resins a basic catalyst is utilized. To stabilize the finished resin, the base is usually neutralized at the end of the manufacturing process. The neutralization results in the formation of either a soluble or insoluble salt depending on the base catalyst and neutralizing acid employed. Since the presence of excess salt can be deleterious to certain end use properties, it is often removed from the resin by techniques such as insoluble salt filtration or ion exchange. From both a cost and polution criteria, it is desirable to avoid removing the salt from the resin. The aqueous resole resin solutions preferably are those that have been neutralized so as to provide particular inert salts that do not need to be removed but enhance the properties of the aqueous resole resin solutions.

The resole resins are formed using bases containing polyvalent cations such as calcium and barium. The cation is converted to a highly insoluble oxalate salt at the end of the manufacturing process. The cation so inerted does not interfere with key application properties of the resole resin.

The calcium or barium oxalate is formed in situ in the resin as very fine insoluble particles which results in very stable dispersions with no tendency to settle or coagulate. The highly insoluble nature of these salts make them, in principle, a highly inert dispersed filler with little tendency to adversely affect key properties, e.g. moisture resistance. Because the dispersions are colloidal, in nature, the resins can be pumped, sprayed and generally handled like salt free resins.

Aqueous resole resin solutions containing dispersed oxalate salts are basically resole resins prepared using calcium or barium hydroxide and neutralized with oxalic acid or ammonium oxalate.

The base catalyzed reaction of from 1.3 to 2.8 mols of formaldehyde with one mol of phenol is carried out in the presence of calcium or barium hydroxide. Additional bases such as sodium hydroxide or organic amines may be added as cocatalysts and pH regulators for the resin system. Typically, between 0.02 and 0.30 mol equivalents of total base per mol of original phenol are utilized. The reaction is carried out at a temperature range of from 40° to 80° C.

The resole reaction is preferably carried out with aqueous formalin solution of between 30–70% formaldehyde with completed reaction solids adjusted to 60–99% by vacuum stripping to remove water or by addition of water.

Aqueous resoles containing dispersed salts can be used in the presence of variety of formaldehyde scavengers and resole co-reactants. Suitable formaldehyde scavengers and resole co-reactants include nitrogen containing organic compounds soluble in the resole, or molecular weight less than 300, containing at least one NH group per molecule reactive with formaldehyde. Examples include ammonia, primary and secondary amines, urea, substituted ureas, primary amides, dicyandiamide, guanidines and aminotriazines such as melamine, guanamine and benzoguanamine. Depending on the advancement of the resole it may be preferable to add the scavengers and resole co-reactants just prior to end use to avoid storage stability problems such as rapid loss of resole water tolerance or the precipitation of resin components. Alternatively, the formaldehyde scavenging reaction is carried out at the end of the resole reaction, prior to neutralization with oxalate, preferably at a temperature in the range of 20° to 60° C., to minimize oligomerization of the resole. The amount of co-reactant added can vary within very wide limits up to 1.0 mol per mol of phenol in the original reaction mixture. It is preferred to use between 0.5 and 1.5 mol equivalents of scavenger per mol of free formaldehyde present at the end of the resole reaction.

The preferred catalyst for resole stage is barium or calcium hydroxide. Supplementary bases which can be used with the main catalyst include alkali metal hydroxides such as lithium hydroxide, sodium hydroxide and potassium hydroxide, alkali metal carbonates such as sodium carbonate and potassium carbonate, aqueous ammonia and amines of molecular weight less than 300. The process can be carried out wherein said catalyst comprises said alkaline earth hydroxides used in combination with a compound selected from the group consisting of lithium hydroxide, sodium hydroxide, potassium hydroxide, sodium carbonate, potassium carbonate, organic amines, aqueous ammonia and mixtures thereof wherein about 0.02 to 0.30 mol equivalents of combined catalyst are used per mol of phenol charged, said alkaline earth catalysts constituting about 50 to 95% of the mol equivalents provided by said combined catalyst.

At the end of the reaction the barium and calcium hydroxide are neutralized with sufficient oxalate to yield a highly insoluble dispersed salt and adjust the pH within the range of 3.0 to 8.5. The supplementary bases are partially neutralized as necessary and function to control the resin pH between 3 and 8.5. Preferably, the pH is adjusted between 6.0 and 8.0.

The formation of the insoluble oxalate can conveniently be done by adding solid oxalic acid (usually oxalic acid dihydrate) ammonium oxalate or water solutions of these to the resole system. Factors such as agitation and temperature are important in obtaining a fine particle dispersion. Neutralization is carried out in the range of 25° to 75° C., preferably 30°-60° C., wherein precipitation of the inert salts occur. Generally, the higher the temperature the finer the precipitated particle. Agitation should be consistent with the mixing required for a given vessel and known engineering practices for stirred tanks. Generally, the higher the agitation the smaller the particle size and can be adjusted to an intensity consistent with the particle size required by simple experimentation for a specific stirred tank.

The oxalate salt formed in water dispersion are characterized by excellent stability with regard to sedimentation and shear. Particle size is extremely small being below $2\mu$ and normally averaging from about 0.01 to $1.0\mu$, preferably 0.02 to $0.8\mu$.

The inert salts unexpectedly do not flocculate or precipitate and are stable in water solutions of the resole resins of this invention if the resole resin content is from about 40 to 98% by weight. If the solutions are diluted to lower than about 40% solids then flocculation and precipitation of the salts can occur. Hence, although the resole resins as resins are highly dilutable, and have a water tolerance greater than 500% the aqueous resole solutions containing the inert salts are not since the inert salts will flocculate in solutions containing less than about 40% by weight of resole resins solids. The resole resin solutions having dispersed inert salts can be made dilutable by the addition of an anionic dispersing agent to inhibit the flocculation of the salts.

The preparation of the resole resin solutions preferably used in the present composition have been disclosed in U.S. Pat. No. 4,011,186.

The resole resins then are solutions having varying amounts of water with a resin solids content of 60 to 99%. However, in foamable compositions, the preferred resole resin solutions have water contents of less than 10%. A water-content of more than 10% in the resin is detrimental in that it absorbs too much exothermic heat in the acid catalyzed blowing step and thus less expansion takes place whereby undesirably high apparent density products of non-uniform texture and large voids are obtained. When cellular structures of very low apparent density (0.2 ro 2.0 pounds per cubic foot) are to be made, a water-content less than 5% in the "A" stage reaction product is preferred.

The resoles may have a viscosity of from about 100 to 200,000 centipoise preferably 200 to 4000 cps. If the viscosity is too low, there is a tendency for the foaming agents to volatilize in the form of large bubbles. Foams thus produced are characterized by an open cellular structure and large voids which are not desired in foams used for insulating purposes. The viscosity range required for the particular foaming agent used can be determined by one skilled in the art. The size of the cells in the above-described foaming materials is determined by a number of other factors: the size of the cells depends for one thing on the nature and quantity of the blowing agent used, the reaction temperature, and the hardening characteristics of the resin. Thus, by changing the type and quantity of the foaming or interlacing agent, the temperature employed and the composition of the resin, it is possible to produce foams of different density, hardness and rigidity, i.e., foams having pores of different sizes.

The resoles preferably used in the present composition are the reaction product of a phenol and an aldehyde. Generally, from about 1.3 to 2.8 mols of aldehyde per mol of phenol are employed. The lowest density foamed structures (0.2 pound per cubic foot) have been obtained when condensation products were used based on 1.3 to 1.6 mols of formaldehyde reacted per mol of phenol. Phenolic condensation products in which more than 1.6 mols and up to 3 molds of formaldehyde have been reacted with the phenol tend to release loosely bound formaldehyde during the acid-catalyzed reaction. Since this release of formaldehyde is an endothermic type of reaction, it correspondingly reduced the amount of exothermic heat of reaction caused by the acid catalyst. Therefore, there is less heat available for vaporizing the volatile matter in the reaction mixture whereby a lower degree of expansion occurs resulting inc ellular structures of higher apparent densities, e.g., 2 to 20 pounds per cubic foot. On the other hand, "A" stage condensation products having a reacted formaldehyde ratio between 1.0 and 1.2 mols per mol of phenol tend to harden before maximum expansion can occur and have less exothermic heat; this is reflected by a somewhat higher density of the foamed structures made therefrom.

Typical of the phenols that are useful in producing suitable resole resins are those represented by the formula

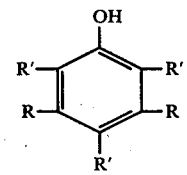

wherein at least two groups represented by R' are hydrogen atoms and the groups represented by R and any remaining group represented by R' are hydrogen atoms or groups which do not impede the condensation of the phenol with an aldehyde (e.g. a substituent such as halogen atom or a hydroxy, alkyl or aryl group). Illustrative of suitable phenols are phenol, cresols (particularly m-cresol), xylenols (particularly 3,5-xylenol) and dihydroxybenzenes (particularly resorcinol). Typical of the aldehydes that can be useful in producing suitable resole resins are formaldehyde (including the oligomers and polymers of formaldehyde such as trioxane), furfural, sugars and cellulose hydrolyzates. Such aldehydes can be employed without dilution or dissolved in suitable solvents including aqueous alcohols (e.g. aqueous methanol, n-propanol, isobutanol or n-butanol).

FOAM PREPARATION

The manufacture of the foams is generally performed by thoroughly mixing a phenolic resole resin with a surface active substance, a blowing agent and calcium oxide particles to form said foamable resole resin composition. When uniformly mixed an acid curing agent is uniformly mixed with said composition and the composition allowed to foam and cure using the reaction exotherm or applied heat. The temperature of the reaction is generally kept under 100° C., if a closed cell foam is desired. Higher temperatures can be used to form open-celled foams.

The foaming of the phenolic resin is performed after the individual components have been mixed together, the blowing agent being transformed to the gaseous state. Depending on the composition of the mixture to be foamed, the foaming takes place at temperatures between 0° and 100° C., preferably at 15° to 70° C. The resin can be foamed either in open or in closed molds to produce bodies of a shape corresponding to the shape of the open or closed mold selected.

It is also possible to perform the foaming process continuously in a double band press. In this case the components are proportioned and mixed by means of a known automatic proportioning and mixing apparatus and the mixture is fed continuously to the bands of a double band press by means of a charging device moving crosswise to the direction of movement. Then the mixture is passed through a gap of selectable thickness formed between one roll and a support which may, if desired, also be a roll. The rolls can be preheated if desired. By this process boards of selectable thickness are obtained.

The hardening is generally so controlled that, as soon as the desired foam volume is reached, the foam structure has solidified to such an extent as to forestall collapse.

SURFACTANTS

Improvements in foam cell uniformity and size are secured by the use of a surface active agent. Particularly useful are the non-ionic types such as polyethers and polyalcohols, such as condensation products of alkylene oxides (such as ethylene oxide and propylene oxide) with alkyl phenols, fatty acids, alkyl silanes and silicones and like materials, as is exemplified by such products as octadecyl phenol-ethylene oxide, decyl phenol-ethylene oxide sulfate and low polymers of such materials as polyoxyethylene dodecyl phenol, octyl phenol polyethylene glycol ether, ricinoleic acid polyethylene glycolate, stearic acid polyoxyethylene, glycolates and similar polyoxyethylates fatty acids and vegetable oils as well as polyoxyethylated fatty acid esters as polyoxyethylene sorbitan monolaurate, polyoxyethylene sorbitan tristearate, polyoxypropylene sorbitan monolaurate, polyoxy(propylene-ethylene) sorbitan monolaurate and polyoxyethylene sorbitan pentaoleate; polyoxyethylene sorbitan monopalmitate and siloxane-oxyalkylene block copolymers such as those containing a Si-O-C linkage between the siloxane and oxyalkylene moieties and those containing a Si-C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed of recurring oxyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecanol-9-dimethyl ethyl ammonium bromide and diisobutylphenoxyethoxy ethyl dimethyl benzyl ammonium chloride and sorbitan fatty acid esters such as sorbitan monlaurate, sorbitan monopalmitate sorbitan monostearate, sorbitan trioleate and like esters.

When present, these surface active agents can be employed in any desired amount depending on what results are desired. They serve to aid the generation of smaller and more uniform cells. Best results seem to be secured in using amounts from 0.3 to about 5% by weight of the agent based on the weight of resole resin with preferred results at between about 0.5 to 3% by weight. Certain surfactants may cause collapse of the foam if employed in too great a concentration and optimum concentration may vary with the individual surfactant selected.

BLOWING AGENTS

The foaming agents which may be used to foam the resins of this invention include carbon dioxide liberating materials, low boiling aliphatic hydrocarbons, polyhalogenated saturated fluorocarbons and ethers. Exemplary of carbon dioxide, liberating compounds are alkali and alkaline earth carbonates such as sodium bicarbonate or calcium carbonate which, in the presence of an acid, liberate carbon dioxide. Another group of blowing agents comprises low-boiling organic compounds, such as carbontetrachloride, ethylene dichloride, n-butyl ether, methylal, n-pentane, chlorofluoromethane or the like. These latter materials are vaporized by the heat evolved in the condensation of the resin or by additionally supplied heat, thereby bringing about foaming of the liquid phenolic resin. Simultaneously with the foaming process, the hardener present in the mixture produces an increasing solidification and finally a hardening of the foam.

Fluorocarbon foaming agents which may be used include dichlorodifluoromethane, 1,2-dichloro-1,1,2,2-tetrafluoroethane, 1,1,1-trichloro-2,2,2-trifluoroethane, 1,2-difluoroethane and trichlorofluoromethane. The compounds should have boiling points ranging from about −30° to 125° C. The blowing agents are employed in an amount sufficient to give the resultant foam the desired bulk density which is generally between 0.5 to 10 and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperature until mixed with the other components.

ACID CATALYSTS

As hardeners both liquid and pulverulent substances may be utilized. The quantity required partially depends on the foaming agent used. If the foaming agent consists of a solid salt which evolves gases, part of the acid is used to release the gases. If low-boiling solvents are employed as foaming agents, the proportion of hardener is lower in accordance therewith. In addition to mineral acids such as HCl, $H_2SO_4$ and the like, water-soluble sulfonic acids are particularly well suited as water-soluble acids, i.e., those sulfonic acids where the sulfonic acid group is directly linked to an aromatic ring which may be substituted. Examples thereof include benzene sulfonic acid, p-toluene sulfonic acid, phenol sulfonic acid, cresol sulfonic acid and the like. The aqueous solutions of these acids are mainly utilized as 40 to 70% by weight solutions. Some acids, such as p-toluene sulfonic acid, may also be used in the pulverulent foam as hardener. The quantity of the hardener used varies between about 1 and 15% by weight, calculated as 100% acid, based on phenol-resole resin.

The preferred sulfonic acid is a mixture of equal parts by weight of toluene sulfonic acid and xylene sulfonic acid, as described in Mausner et. al. U.S. Pat. No. 3,458,449. Another foaming catalyst which has been found to give excellent results are novolac sulfonic acids, described in British Pat. No. 1,283,113.

The catalyst is generally present in the minimum amount that will give the desired cream times of 10 to 50 seconds and firm times of 40 to 500 seconds to the reacting mixture. The catalyst, however, generally comprises foam 0.5 to 20, and preferably comprises from 1.0 to 15 weight percent based on the weight of the resole resin.

The following examples will further illustrate the present invention, however, it is to be understood that the scope of the invention is not limited by the examples.

Calcium Oxide Particles

Corrosion resistance for the foamable composition and the cured foam is gained by dispersing calcium oxide in the foamable resole composition. The calcium oxide (CaO) is ground quicklime formed commercially by heating calcium carbonate ($CaCO_3$). The particle size of the calcium oxide have been found to be most effective if they have a particle size passing through a 40 mesh screen and being retained on a 60 mesh screen. Larger particles may be used, however, larger particles detract from the appearance and physical properties of the foam. Smaller particles than 60 mesh have been found to be too active with the curing acid catalysts so that the compositions fail to foam or collapse because they fail to cure in the foamed condition. The screen mesh or sieve sizes disclosed refer to U.S. Sieve Series of the U.S. Bureau of Standards.

The calcium oxide can be dispersed in the resole composition by conventional means such as stirred tanks or mixers, continuous ribbon blenders or mixers wherein the mixing agitation is sufficient to disperse the calcium oxide uniformly in the resole composition in amounts of 4 to 15% by weight, preferable 4 to 10% based on the resole composition.

Phenolic foams are prepared by adding a strong acid catalyst to a resole resin composition generally having 1 to 20% by weight of a blowing agent and 0.3 to 5% by weight of a surfactant all based on said resole resin composition. Said acid catalyst is present in an amount of 0.5 to 20% by weight based on the weight of said resole composition. The acid catalyst brings the pH of the resole composition to generally less than a pH of 3 giving an exotherm to aid in blowing said foam and causing rapid methylene bridge formation to crosslink and cure the foam. The strong acids remain in the foam and are water leachable leading to corrosion problems.

Most basic materials if added to the resole composition react preferentially and rapidly with the acid catalyst reducing its effectiveness as a catalyst. It has been found that large calcium oxide particles will unexpectedly allow the resin composition to foam and cure with acid catalysts yet yield a cured foam having a pH of about 5 to 10. Corrosion tests showed the foam to be non-corrosive as disclosed in the Examples.

EXAMPLE 1

A base catalyzed aqueous resole resin solution is prepared by reacting 1.57 mol of aqueous formaldehyde (50%) per 1 mol of phenol in the presence of 0.035 mol of sodium hydroxide and 0.032 mol of calcium hydroxide, initially below 60° C., to control reaction exotherm. The reaction is then conducted at 60°-70° C. range until the unreacted formaldehyde content drops below 0.5%. The reaction is cooled to 40° C. and 0.033 mol of oxalic acid is added with agitation. The resulting resin has a viscosity of 450 cps.

EXAMPLE 2

A base catalyzed resole resin solution is prepared by reacting 2.54 mol of aqueous formaldehyde (50%) per 1 mol of phenol in the presence of 0.035 mol of sodium hydroxide and 0.14 mol of calcium hydroxide, initially below 60° C., to control reaction exotherm. The reaction is then conducted at 70° C., reflux until the unreacted formaldehyde content drops to 2.3%. The reaction is cooled to 50° C., and 0.14 mol of oxalic acid is added rapidly with agitation. The viscous dispersion (Brookfield viscosity 3800 cps) is stable to storage at 0°-10° C., with no bottom settling.

EXAMPLES 3-10

To 100 parts of resole resin of Example 2 were added 10 parts of Freon 113[a] and 2 parts DC-193[b] surfactant and mixed. The Ultra TX[c] acid (50% in glycerine) was mixed in rapidly and mixture heated to 65° C. for a period of time sufficient to foam and cure the foam. The latent acid neutralizers (calcium oxide particles) when used, were added before the acid. The following examples in Table 1 show the effect of latent acid neutralizers of this invention upon foam formation, pH of foamed composition and corrosion of iron metal tabs in formed composition.

TABLE 1

| Examples | Acid (parts) | CaO (parts) | CaO (Mesh size)[g] | Stable Foam[d] | pH[e] | Corrosion[f] |
|---|---|---|---|---|---|---|
| 3 | 20 | 6 | <150 | no | — | — |
| 4 | 20 | 6 | 40–60 | yes | 11.0 | none |
| 5 | 20 | 4 | 40–60 | yes | 9.2 | none |
| 6 | 20 | 2 | 40–60 | yes | 2.9 | yes |
| 7 | 20 | 10 | 40–60 | yes | 12.0 | none |
| 8 | 20 | 15 | 40–60 | yes | 13.0 | none |
| 9 | 20 | 6 | > 40 | yes | 11.0 | none |
| 10 | 20 | 0 | — | yes | 2.2 | yes |

[a] trichlortrifluorethane
[b] siloxane-oxyalkalene polymer
[c] toluene-sulfonic and xylene sulfonic acid mixture
[d] foamed to a density of about 2 lbs./per cu.ft. (PCF) having a fine closed cell size of about 0.01 to 0.030 mm.
[e] age foam 3 days, crush 5 gms in 100 cc. of water and test pH
[f] iron tab immersed for 24 hours in solution from test (e) and corrosion evaluated
[g] (mesh size of 40–60) through 40 mesh standard screens and retained on 60 mesh

What is claimed is:

1. An improved foamable resole resin composition curable to a non-corrosive foam, comprising, a resole resin, a blowing agent and a surfactant, wherein the improvement comprises having present in said composition dispersed particles consisting of calcium oxide and having a particle size larger than 60 mesh.

2. A composition of claim 1 wherein said resole resin is contained in an aqueous solution having a pH of about 3 to 8.

3. A composition of claim 2 wherein said resole comprises:
   A. a resole resin having a number average molecular weight is less than about 300, a water tolerance greater than 50%, a combined formaldehyde to phenol ratio in the range of from about 1.0:1 to 2.9:1, and
   B. a dispersion of insoluble oxalate salt particles, wherein said resole being prepared with a catalyst comprising alkaline earth metals hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 60 to 99% by weight.

4. A composition of claim 3 having an aqueous solution wherein said pH range is 6 to 8.5, the resole resin having an average molecular weight of from about 150 to 300, a water tolerance greater than 50%, a combined formaldehyde to phenol ratio of from about 1.0:1 to 2.9:1, wherein the inert oxalate salt is calcium or barium oxalate and wherein said resole resin is present in from about 60 to 99% by weight of said solution.

5. A composition of claim 1 wherein said calcium oxide is present in said composition in an amount of about 4 to 15% by weight of said composition.

6. A composition of claim 1 wherein said calcium oxide has a particle size passing through a 40 mesh screen and being retained on a 60 mesh screen.

7. A composition of claim 1 wherein said blowing agent is selected from the group consisting of carbon dioxide, nitrogen, water, aliphatic hydrocarbons, fluorohydrocarbons, chlorohydrocarbons, chlorofluorohydrocarbons, air and mixtures thereof.

8. A composition of claim 1 wherein said blowing agent is present in amounts of from about 1 to 20% by weight based on said composition.

9. A composition of claim 1 wherein said surfactant is selected from the group consisting of polyethers, polyalcohols, siloxane-oxyalkalene polymers, quaternary ammonium compounds, sorbitan compounds and mixtures thereof.

10. A composition of claim 1 wherein said surfactant present in amounts of from about 0.3 to 5% by weight based on said resole resin.

11. An improved process for preparing a foamable resole resin composition, curable to a non-corrosive foam, comprising blending a resole resin, a blowing agent and a surfactant wherein the improvement comprises dispersing in said composition particles consisting of calcium oxide and having a particle size larger than 60 mesh.

12. A process of claim 11 wherein said resole resin is contained in an aqueous solution having a pH of about 3 to 8.5.

13. A process of claim 11 wherein said resole comprises:
   A. a resole resin having a number average molecular weight is less than about 300, a water tolerance greater than 50%, a combined formaldehyde to phenol ratio in the range of from about 1.0:1 to 2.9:1, and
   B. a dispersion of insoluble oxalate salt particles, wherein said resole being prepared with a catalyst comprising alkaline earth metals hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 60 to 99% by weight.

14. A process of claim 11 having an aqueous solution wherein said pH range is 6 to 8.5, the resole resin having an average molecular weight of from about 150 to 300, a water tolerance greater than 50%, a combined formaldehyde to phenol ratio of from about 1.0:1 to 2.9:1, wherein the inert oxalate salt is calcium or barium oxalate and wherein said resole resin is present in from about 60 to 99% by weight of said solution.

15. A process of claim 11 wherein said calcium oxide is present in said composition in amount of 4 to 15% by weight of said composition.

16. A process of claim 11 wherein said calcium oxide has a particle size passing through a 40 mesh screen and being retained on a 60 mesh screen.

17. A process of claim 11 wherein said blowing agent is selected from the group consisting of carbon dioxide, nitrogen, water, aliphatic hydrocarbons, fluorohydrocarbons, chlorohydrocarbons, chlorofluorohydrocarbons, air and mixtures thereof.

18. An improved process of claim 11 wherein said blowing agent is present in amounts of from about 1 to 20% by weight based on said composition.

19. A process of claim 11 wherein said surfactant is selected from the group consisting of polyethers, polyalcohols, siloxane-oxyalkalene polymers, quaternary ammonium compounds, sorbitan compounds and mixtures thereof.

20. A process of claim 11 wherein said surfactant is present in amounts of from about 0.3 to 5% by weight based on said resole resin.

21. A cured non-corrosive foam formed from the composition of claim 1 wherein the foam was cured with a acid condensing agent, said cured foam having a pH of 5 to 10.

22. A cured non-corrosive foam formed with the process of claim 11 wherein the foam was cured with an acid condensing agent, said cured foam having a pH of 5 to 10.

23. An improved foamable resole resin composition curable to a non-corrosive foam, comprising, a resole resin, a blowing agent and a surfactant, wherein the improvement comprises having present in said composition dispersed particles consisting of calcium oxide and having a particle size larger than 60 mesh wherein calcium oxide is present in said composition in an amount of about 4 to 15% by weight of said composition.

24. An improved foamable resole resin composition curable to a non-corrosive foam, comprising, a resole resin, a blowing agent and a surfactant, wherein the improvement comprises having present in said composition dispersed particles consisting of calcium oxide and having a particle size passing through a 40 mesh screen and being retained on a 60 mesh, wherein said calcium oxide is present in said composition in an amount of about 4 to 15% by weight of said composition.

25. An improved foamable resole resin composition curable to a non-corrosive foam, comprising, a resole resin, a blowing agent and a surfactant, wherein the improvement comprises having present in said composition dispersed particles consisting of calcium oxide and having a particle size passing through a 40 mesh screen and being retained on a 60 mesh, wherein said calcium oxide is present in said composition in an amount of about 4 to 15% by weight of said composition and wherein said resole comprises:
   A. a resole resin having a number average molecular weight less than about 300, a water tolerance greater than 50%, a combined formaldehyde to phenol ratio in the range of from about 1.0:1 to 2.0:1, and
   B. a dispersion of insoluble oxalate salt particles, wherein said resole being prepared with a catalyst comprising alkaline earth metals hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 60 to 99% by weight.

26. An improved process for preparing a foamable resole resin composition, curable to a non-corrosive foam, comprising blending a resole resin, a blowing agent and a surfactant wherein the improvement comprises dispersing in said composition particles consisting of calcium oxide and having a particle size passing through a 40 mesh screen and being retained on a 60 mesh screen, said calcium oxide being present in said composition in amount of 4 to 15% by weight of said composition, said resole comprising:
   A. a resole resin having a number average molecular weight less than about 300, a water tolerance greater than 50%, a combined formaldehyde to phenol ratio in the range of from about 1.0:1 to 2.9:1, and
   B. a dispersion of insoluble oxalate salt particles, said resole being prepared with a catalyst comprising alkaline earth metals hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 60 to 99% by weight.

* * * * *